(12) United States Patent
Tan

(10) Patent No.: US 7,420,686 B2
(45) Date of Patent: Sep. 2, 2008

(54) WAVELENGTH MEASUREMENT METHOD BASED ON COMBINATION OF TWO SIGNALS IN QUADRATURE

(75) Inventor: Sze Meng Tan, Sunnyvale, CA (US)

(73) Assignee: Picarro, Inc., Sunnyvale, CA (US)

( * ) Notice: Subject to any disclaimer, the term of this patent is extended or adjusted under 35 U.S.C. 154(b) by 68 days.

(21) Appl. No.: 11/651,372

(22) Filed: Jan. 8, 2007

(65) Prior Publication Data

US 2007/0195328 A1 Aug. 23, 2007

Related U.S. Application Data

(60) Provisional application No. 60/776,396, filed on Feb. 23, 2006.

(51) Int. Cl.
*G01B 9/02* (2006.01)
*G01J 3/45* (2006.01)

(52) U.S. Cl. ..................................... 356/454
(58) Field of Classification Search ............... 356/450, 356/451, 454, 519
See application file for complete search history.

(56) References Cited

U.S. PATENT DOCUMENTS

| | | | |
|---|---|---|---|
| 3,967,211 A | 6/1976 | Itzkan et al. | |
| 4,172,663 A * | 10/1979 | Byer et al. | 356/454 |
| 4,173,442 A | 11/1979 | Snyder | |
| 4,815,081 A | 3/1989 | Mahlein et al. | |
| 5,420,687 A | 5/1995 | Kachanov | |
| 5,798,859 A | 8/1998 | Colbourne et al. | |
| 6,122,301 A | 9/2000 | Tei et al. | |
| 6,178,002 B1 | 1/2001 | Mueller-Wirts | |
| 6,289,028 B1 | 9/2001 | Munks et al. | |
| 6,331,892 B1 | 12/2001 | Green | |
| 6,400,737 B1 | 6/2002 | Broutin et al. | |
| 7,079,253 B2 * | 7/2006 | North-Morris et al. | 356/454 |

* cited by examiner

*Primary Examiner*—Michael A Lyons
(74) *Attorney, Agent, or Firm*—Lumen Patent Firm, Inc.

(57) ABSTRACT

In a dual etalon wavelength monitor, improved performance is obtained by identifying first and second dead zones where the first and second etalon signals respectively have significantly reduced sensitivity. When a measurement is in the first dead zone, only the second etalon signal is employed to determine wavelength. When a measurement is in the second dead zone, only the first etalon signal is employed to determine wavelength. When a measurement is in neither zone, both first and second etalon signals are employed to determine the wavelength.

15 Claims, 3 Drawing Sheets

WAVELENGTH MEASUREMENT METHOD BASED ON COMBINATION OF TWO SIGNALS IN QUADRATURE

CROSS REFERENCE TO RELATED APPLICATIONS

This application claims the benefit of U.S. provisional application 60/776,396, filed on Feb. 23, 2006, entitled "Method and Apparatus for Improved Cavity Ring-Down Spectroscopy", and hereby incorporated by reference in its entirety.

FIELD OF THE INVENTION

This invention relates to measurement of optical wavelength.

BACKGROUND

In many laser applications, accurate and precise knowledge of the laser emission wavelength is required. For example, wavelength division multiplexing for optical telecommunications typically requires a wavelength precision on the order of several GHz. Spectroscopic applications, such as cavity ring-down spectroscopy, can have much more stringent wavelength precision requirements (e.g., on the order of 1 MHz). Although lasers inherently having a very precisely defined output wavelength are known, such lasers tend to be costly and tend to operate at a fixed wavelength, both of which are significant practical disadvantages. Instead, it is usually preferred to employ small, inexpensive lasers, such as semiconductor diode lasers, whenever possible. However, the output wavelength of a diode laser is typically not known with sufficient accuracy for spectroscopic applications, even if a wavelength calibration is carried out on a laser diode (e.g., wavelength vs. diode current).

Accordingly, various approaches have been considered in the art for providing wavelength monitoring, especially in connection with laser diodes. One conceptually straightforward approach is to provide the laser diode output to a general purpose spectrometer having sufficient accuracy and precision to meet the overall requirements. Since general purpose spectrometers having a resolution on the order of 1 MHz for optical wavelengths are large, expensive laboratory instruments, this approach is typically too expensive to consider seriously. Instead, the various approaches that have been considered can be regarded as providing spectrometers having sufficient accuracy and precision that are not "general purpose", thereby allowing exploitation of special features of the wavelength monitoring problem.

Some such approaches are based on the use of an etalon as a wavelength sensitive element. An etalon provides a response (e.g., reflectance or transmittance) that is a periodic function of wavelength. The period of an etalon is referred to as its free spectral range (FSR). Measurement of the etalon response provides an ambiguous wavelength measurement, since two wavelengths in each FSR are compatible with the measured etalon response. Removal of this ambiguity can be performed in various ways. For example, a separate wavelength measurement having a precision sufficient to resolve wavelengths separated by 1 FSR can be employed to remove the ambiguity. Alternatively, the laser output wavelength may be known as a function of its operation condition (e.g., current) with sufficient precision to remove the ambiguity. Thus ambiguity removal can be regarded as providing a coarse wavelength measurement having a resolution on the order of the FSR, while the etalon response provides a fine wavelength measurement having a resolution much less than the FSR.

A key advantage of etalon-based approaches is reduced size and cost compared to many other approaches. For example, a 2 mm thick etalon of BK7 glass has an FSR of about 50 GHz, and can provide wavelength measurement precision on the order of 1 MHz.

However, etalon based wavelength monitors having only a single etalon have "dead spots" in their performance, where sensitivity to changes in wavelength is greatly, and undesirably, reduced. These dead spots arise from the local maxima and local minima of the etalon response, where each FSR includes at least one local maximum and at least one local minimum of the etalon response. The problem of dead spots in an etalon wavelength monitor can be alleviated by providing a second etalon in the wavelength monitor. For example, etalons having two different FSRs are considered in U.S. Pat. No. 5,798,859. Another example is U.S. Pat. No. 6,178,002, where two etalons having the same FSR but having a relative phase shift of about 90° are considered. In these examples, a wavelength signal is derived from two etalon responses.

Combination of two etalon responses to provide a single wavelength signal is a problem which arises specifically in connection with dual-etalon wavelength monitors. Such combination is especially critical in cases where the wavelength signal is employed for closed loop control of the laser wavelength. Although closed loop wavelength control based on signals from two etalons is considered in U.S. Pat. No. 6,178,002, this loop includes relatively complicated calculations.

Accordingly, it would be an advance in the art to provide dual etalon wavelength monitoring where etalon signals are combined to provide a wavelength signal in a simpler manner.

SUMMARY

In a dual etalon wavelength monitor, improved performance is obtained by identifying first and second dead zones where the first and second etalon signals respectively have significantly reduced sensitivity. When a measurement is in the first dead zone, only the second etalon signal is employed to determine wavelength. When a measurement is in the second dead zone, only the first etalon signal is employed to determine wavelength. When a measurement is in neither zone, both first and second etalon signals are employed to determine the wavelength.

DETAILED DESCRIPTION

Figure 1:
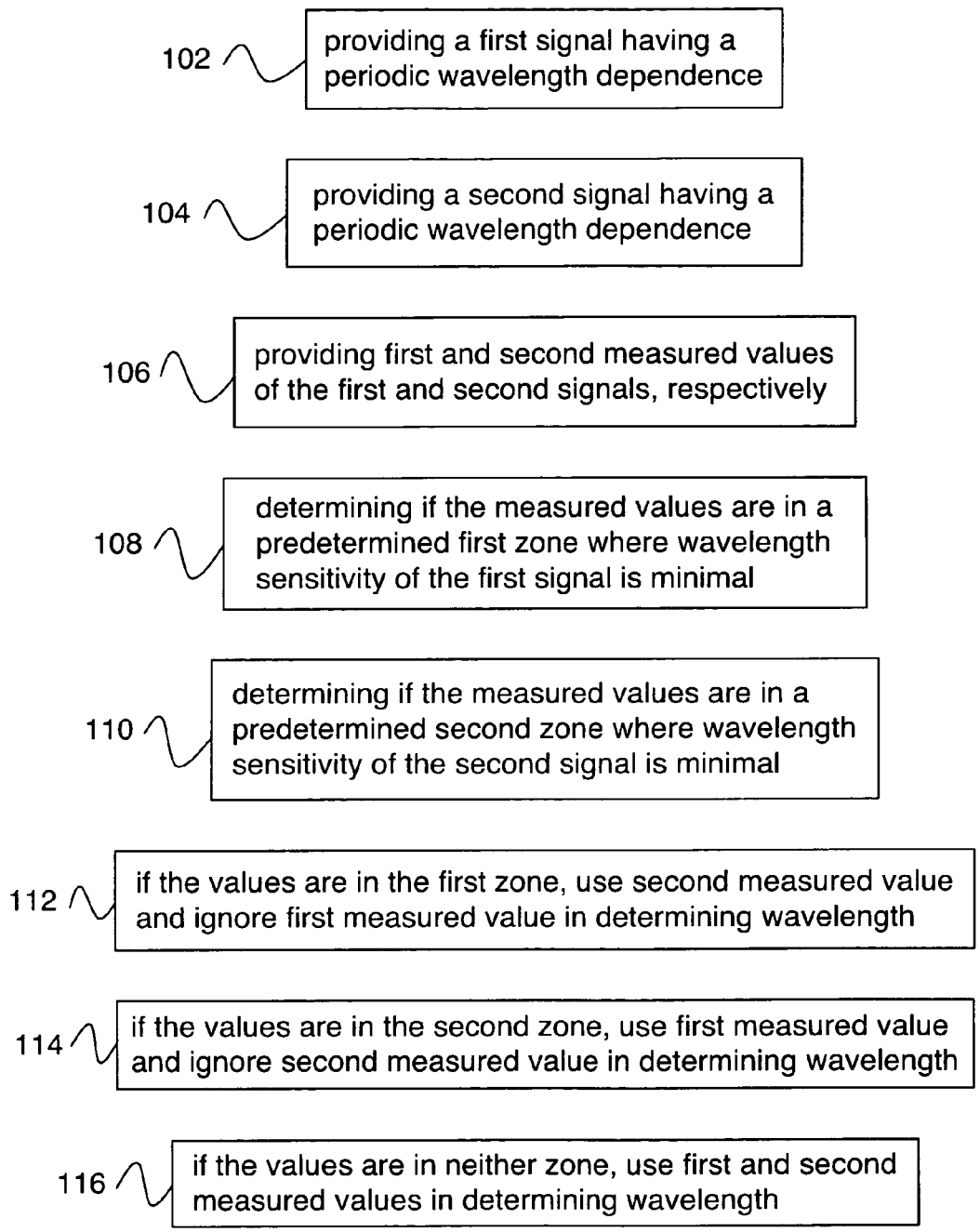
FIG. 1 shows a method for wavelength monitoring according to an embodiment of the invention.

FIG. 1 shows a method for wavelength monitoring according to an embodiment of the invention. Step 102 is providing a first signal having a substantially periodic wavelength dependence. Step 104 is providing a second signal having a substantially periodic wavelength dependence. The first and second signals can be obtained by illuminating an etalon and receiving a response from the etalon. The etalon response can be a reflectance, a transmittance, or any combination of reflectance and transmittance. In a preferred embodiment, both reflectance and transmittance from the etalon are measured, and the etalon response is a ratio of the reflected signal to the transmitted signal. Providing such a normalized response is preferably done for both the first and second signals, since signal variation due to input optical power fluctuations is thereby suppressed.

Figure 2:
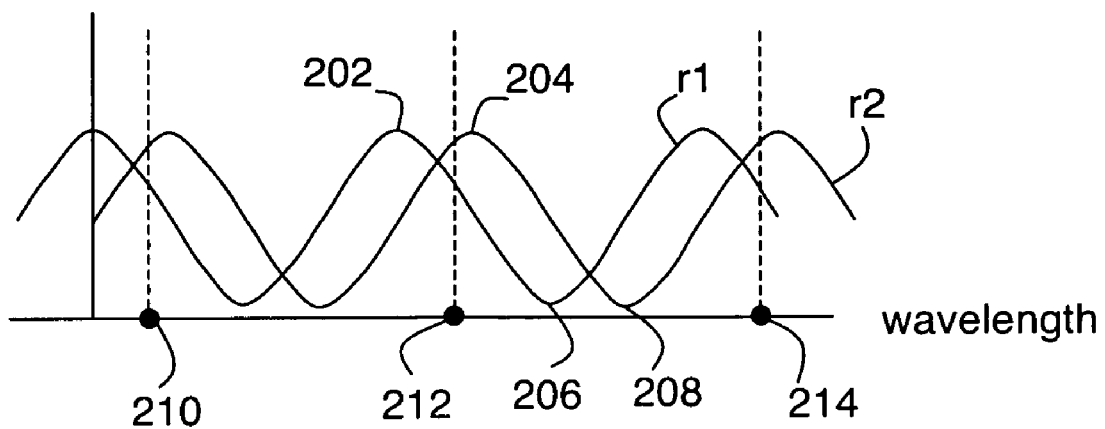
FIG. 2 schematically shows two etalon signals in quadrature.

The first and second signals have substantially the same period, and have a phase difference substantially equal to an odd multiple of 90°. FIG. 2 schematically shows an example of two such signals, where r1 is the first signal and r2 is the second signal. In the example of FIG. 2, the two signals have equal amplitude, which is preferred but not required in practicing the invention. Signal r1 has "dead spots" of minimal wavelength sensitivity at maxima such as 202 and at minima such as 206. Similarly, signal r2 has dead spots of minimal wavelength sensitivity at maxima such as 204 and at minima such as 208. Preferably, the first and second signals are obtained by illuminating a single etalon at two different positions with two optical beams. The phase difference of the first and second signals is preferably set by establishing a small difference between the angles of incidence of the two optical beams on the etalon.

For a perfectly parallel etalon of refractive index n and of thickness t, light of wavelength λ traveling within the material at angle $\theta_{internal}$ to the normal undergoes a phase shift of $$\delta = \left(\frac{2\pi}{\lambda}\right) 2nt\cos\theta_{internal}, \qquad (1)$$

between successive reflections off the same interface. For two beams to produce signals which are in quadrature, their angles of propagation within the etalon must be such that for the beams differs by an odd multiple of π/2. The corresponding angles of incidence $\theta_1$ and $\theta_2$ (in radians) which provide signals differing by this odd multiple of π/2 satisfy the relation (in the approximation of small angles $\theta_1, \theta_2 \ll 1$ radian), $$\theta_2^2 - \theta_1^2 = \frac{n\lambda}{4t}(2m+1), \qquad (2)$$

where m is any integer.

Consider as an example an etalon made of fused silica with 50-GHz FSR, and a beam of wavelength 1.5 microns. The refractive index of fused silica is 1.444 at this wavelength, and the 50-GHz etalon thickness is 2.0 mm. For geometric convenience of separating the reflected beam from the incident beam (as in FIG. 4), assume that $\theta_1$ (the smaller incident angle) is 20.0 milliradians. Using the formula above with m=0, $\theta_2$ is therefore 25.9 milliradians.

The etalon preferably has the same thickness at the two beam locations, at least within one FSR. A small difference in thickness, especially if less than one FSR, can be compensated by adjusting the difference between angles of incidence at the two beam locations. Since the angular acceptance of the etalon as an optical filter decreases with increasing angle of incidence, small angles for both beams are preferred. In addition, the tuning rate of the etalon filter as a function of angle of incidence increases for increasing angle of incidence. Thus, angular alignment is more sensitive for increasing angle of incidence; so, smaller angles of incidence are preferred to minimize the alignment sensitivity.

Since the phases of the etalon signals are not equal at the beam locations, the FSRs of the first and second signals cannot be exactly the same. Accordingly, it is preferred to select the angles of incidence such that the resulting difference in FSR is negligible, which is typically possible in practice. In this sense, the periods of the first and second signals are "substantially the same" in cases where this FSR difference is negligible.

The free spectral range (FSR) is the change in optical frequency which causes the phase shift, δ, to change by 2π, $$FSR = \frac{1}{2nt\cos\theta_{internal}}, \qquad (3)$$

where the FSR is stated as inverse wavelength 1/λ (e.g. wavenumbers, which have units of cm$^{-1}$). "Substantially the same" in the context of the two beams means that the FSRs at the two beam locations differ by no more than a small fraction of their average. Ideally, the phase difference between the two signals is π/2 (m=0 in the formula above), thus providing the quadrature phase difference between the two etalon signals, while simultaneously minimizing the difference between the FSRs. In practice, the difference in FSRs must be small enough so that an integer multiple of π phase difference between the two etalon signals never occurs over the entire range of wavelengths of intended operation, and preferably the phase difference is maintained at substantially π/2. An integer multiple of π phase difference must be avoided since both signals would possess dead spots at similar wavelengths under integer multiple of π relative phase condition. This requirement implies that, for a single contiguous optical frequency range of intended operation, that the relative phase must be greater than mπ at one end of the range and less than (m+1)π at the other end, where m is the same integer as in the equation relating the incident angles. The relative phase is proportional to the optical frequency (ignoring the effect of material dispersion). For example, if the intended range of operation is 1200-1800 nm, then m must be between −3 and +2 (inclusive). For m=+2, the relative phase at 1200 nm would be 2π, at 1800 nm would be 3π, and at 1500 nm in the middle of the range would be 5π/2. Similarly, if m=+1, then the relative phase 3π/2 would need to occur somewhere in the range 1350 and 1800 nm (because 1800/1350=(2π)/(3π/2)). If m=0, then the relative phase π/2 would occur anywhere in the range 1200-1800 nm. In the example above of the 50-GHz etalon, the phase difference is intentionally set to π/2 at 1.5 microns wavelength by using m=0 to compute the second angle of incidence; thus the FSRs are as nearly identical as possible, and the relative phase between the two etalon signals will be within 0 and π in the frequency range from zero (infinite wavelength) to twice the frequency corresponding to 1.5 microns wavelength (e.g. 0.75 microns wavelength), ignoring the effect of material dispersion.

The criterion that the relative phase between signals changes by less than π is modified by the use of the first and second zones as described below in connection with FIG. 3. In this case, the phase can change by only an amount equal to π minus the sum of half of the full width of each zone.

As noted above, the etalon preferably has the same thickness at the two beam locations. However, the thickness may be different at the two locations by either an arbitrary known amount (modifying the above equations to account for the difference in thickness), or an unknown amount that changes the relative phase of the signals by less than π, since such a small change still permits determining two angles of incidence which satisfy the condition that the FSRs are substantially the same.

Step 106 is providing first and second measured values of the first and second signals, respectively. Such measurements can be performed with any kind of optical detector, and are preferably performed with semiconductor photodiodes.

Step 108 is determining whether or not the measured values are within a predetermined first zone, where sensitivity of the first signal to wavelength change is minimal in the first zone. Similarly, step 110 is determining whether or not the measured values are within a predetermined second zone, where sensitivity of the second signal to wavelength change is minimal in the second zone. The first and second zones can be defined in various ways. For example, the first zone can be defined in terms of the first signal being sufficiently close to one of its local maxima or local minima, and similarly for the second zone.

Figure 3:
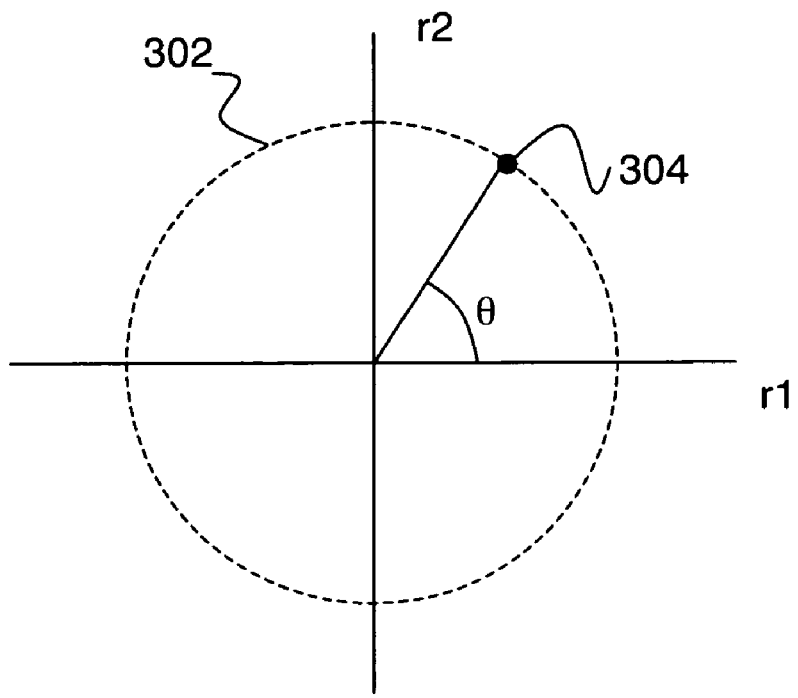
FIG. 3 shows a polar coordinate representation of two etalon signals.

A preferred method of defining the first and second zones is based on a polar representation of the first and second signals, as shown on FIG. 3. In this representation, the two signals are represented by a single point (e.g., 304) in an r1-r2 coordinate system (with the DC offsets removed). As the wavelength changes, point 304 will trace out a path 302 in the r1-r2 plane. Path 302 is a circle if the two signal amplitudes are the same, and is an ellipse if the signal amplitudes are unequal. The first and second zones can be conveniently defined in terms of the angle $\theta$ of this polar representation. Thus the first zone includes angles at or near $\theta=0°$ (preferably, $|\theta|<25°$) and angles at or near $\theta=180°$ (preferably, $|\theta-180°|<25°$), and the second zone includes angles at or near $\theta=90°$ (preferably, $|\theta-90°|<25°$) and angles at or near $\theta=270°$ (preferably, $|\theta-270°|<25°$). Since the first and second zones do not overlap, there are three cases to consider: first zone, second zone, and neither first nor second zone.

Step 112 relates to situations where the measured values are in the first zone. In this zone, the wavelength sensitivity of the first signal is significantly reduced, so the first signal is ignored in determining the wavelength. The wavelength is determined from the second signal.

Step 114 relates to situations where the measured values are in the second zone. In this zone, the wavelength sensitivity of the second signal is significantly reduced, so the second signal is ignored in determining the wavelength. The wavelength is determined from the first signal.

Step 116 relates to situations where the measured values are not in the first or second zones. In this case, both signals provide a useful degree of wavelength sensitivity, and the wavelength is determined from both signals.

Determination of the wavelength from the first and/or second signals is described in greater detail in connection with the example of FIG. 3. In particular, the first and/or second signals provide a partial determination of the wavelength due to the wavelength ambiguity of etalon wavelength measurement approaches. For example, point 304 on FIG. 3 corresponds to several different wavelengths on FIG. 2, such as wavelengths 210, 212, and 214. The invention can be practiced in connection with any method for removing this wavelength ambiguity. Preferably, this wavelength ambiguity is removed by providing a sufficiently accurate source wavelength calibration.

Figure 4:
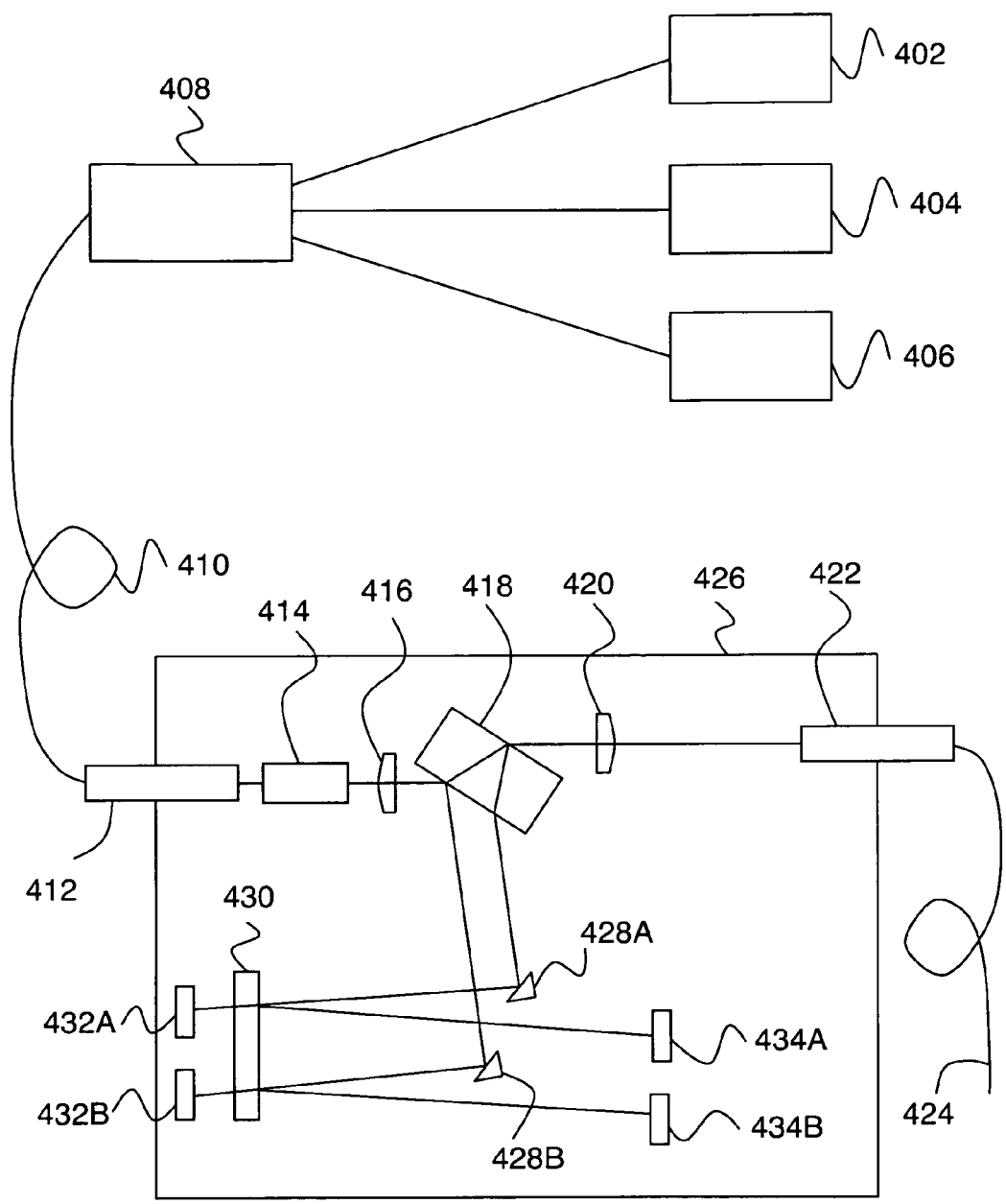
FIG. 4 shows an exemplary system including a wavelength monitor according to an embodiment of the invention.

FIG. 4 shows an exemplary system including a wavelength monitor according to an embodiment of the invention. In this system, several laser sources (source 402, source 404, and source 406) provide output to an optical switch 408, which couples a selected one of the sources to optical fiber 410. The sources are preferably laser diodes having narrow linewidth and pigtailed with polarization maintaining fiber. A tuning range of about 0.25 cm$^{-1}$ is required for measuring a single spectral feature, while broader tunability, or the ability to switch between several narrowly tunable sources, is needed for multi-species detection and/or to obtain additional information about interfering spectral lines or other trace species. In this example, switching between several narrowly tunable sources is employed to provide such capability. Thus each of sources 402, 404, and 406 is narrowly tunable. Conventional "single wavelength" laser diodes, such as DFBs, can provide the required level of narrow tunability by current and/or temperature tuning. A single wavelength monitor (e.g., as in FIG. 4) can provide wavelength measurements for several sources in cases where only one source at a time provides input to the monitor.

The monitor permits the measurement of the wavelength of a laser on time-scales of a few tens of microseconds. The results of such measurements may be used in a feedback loop to control the laser current and to lock the laser wavelength to a desired set point. The speed of such wavelength locking is also high enough that when the laser is used in a cavity ring down spectrometer, a sequence of consecutive ring downs may be programmed to occur at essentially arbitrarily chosen wavelengths. The freedom to choose the wavelengths at which a spectrum is sampled allows a variety of "measurement schemes" to be designed for different applications. For example, one may optimize for the accurate measurement of the peak of an absorption line, its line width, or its strength (area). Alternatively, one may optimize for speed rather than precision in order to obtain a spectrum over as wide a range of frequencies as possible.

Optical fiber 410 is connected to a wavelength monitor subsystem mounted on a bench 426. Preferably, bench 426 is a CuW bench to provide good thermal conductivity and mechanical stability. Most of the light provided to the wavelength monitor by input fiber 410 is coupled to output fiber 424 along a primary beam path. Light in output fiber 424 is available for use in other parts of the overall system (e.g., as source light in a cavity ring-down spectroscopy (CRDS) system).

The primary beam path includes an input graded-index (GRIN) collimating lens 412, an isolator 414, an optional first weak lens 416, a beam splitter 418, an optional second weak lens 420, and an output GRIN collimating lens 422 coupled to output fiber 424. Input fiber 410 and output fiber 424 are preferably single-mode polarization-maintaining fiber, since a single mode having known polarization is preferred for CRDS. Fiber end faces are preferably angled throughout to reduce fiber back reflection. Lens 412 provides an approximately collimated beam having a diffraction length (or Rayleigh range) much greater than the total beam path length within the wavelength monitor. A typical $1/e^2$ intensity beam diameter is about 0.5 mm, although beam diameters from 0.1 mm to 10 mm can be employed. Isolator 414 is preferably a double stage isolator. Preferably, input fiber 410 is oriented such that light incident on beam splitter 418 (after passing through isolator 414, which may rotate the polarization) is s-polarized with respect to beam splitter 418. Optional weak lens 416 can provide adjustment of the collimated beam alignment to relax assembly alignment tolerance for input fiber 410 and lens 412. Optional weak lens 420 can provide adjustment of the collimated beam alignment to relax assembly alignment tolerance for output fiber 424 and lens 422.

Beam splitter 418 diverts some of the light from the primary beam path. Measurements of the diverted light are employed for wavelength monitoring. Reflection from the front and back surfaces of beam splitter 418 provide first and second monitor beams. The surfaces of beam splitter 418 can be coated to provide the desired level of reflectivity for a given angle of incidence. In one design, beam splitter coatings are employed to provide approximately 5% reflectance at each beam splitter surface for s-polarized light at a 55° angle of incidence.

The first monitor beam is reflected from the front surface of beam splitter 418, is reflected from fold mirror 428B and is incident on etalon 430. The transmitted part of the first monitor beam is received by detector 432B, and the reflected part of the first monitor beam is received by detector 434B. Similarly, the second monitor beam is reflected from the back surface of beam splitter 418, is reflected from fold mirror 428A and is incident on etalon 430. The transmitted part of the second monitor beam is received by detector 432A, and the reflected part of the second monitor beam is received by detector 434A. Mirrors 428A and 428B are positioned and sized to avoid beam clipping. The first and second monitor beams are incident on different locations of etalon 430.

Detectors 432A,B and 434A,B should collect their entire respective beams. Collection lenses can be included with one or more of the detectors, to permit the use of photodiodes which are smaller than their corresponding beams and/or to provide beam steering onto the detector element. Alternatively, collection lenses can be omitted and large-area detectors can be employed (e.g., one design has 2 mm diameter InGaAs detectors). Detector mounting is preferably mechanically stable, since detector motion can cause spurious changes in signals that may interfere with wavelength measurement. As indicated above, it is preferred to generate a ratio of reflected power to transmitted power for the etalon signals, and this ratio can be determined by analog or digital division.

Etalon 430 can be made of any optical material (e.g., BK7 glass), but is preferably CTE matched to bench 426. The desired free spectral range (typical FSRs are from about 10 GHz to about 100 GHz) determines the thickness of etalon 430 (e.g., a 50 GHz FSR corresponds to a 2 mm thick etalon of BK7 glass), and the angles of incidence on the etalon are determined by geometric convenience and the requirement to provide about a 90° phase difference between the two signals. Etalon 430 can have coatings on its surfaces to equalize the maximum power in the reflected and transmitted beams, which is preferred to simplify design. Coatings providing reflectances of about 20% at each surface of the etalon have been found suitable for this purpose. The angles of incidence on the etalon are preferably small, to avoid spatial beam walk-off within the etalon (which limits the angular acceptance, equivalently the smallest optical beam which can be used), and are preferably in a range from about 1° to about 3°. The smaller of the two angles of incidence is preferably large enough to avoid clipping of any reflected beam.

The temperature dependence of the etalon thickness (CTE) and refractive index (thermo-optic coefficient) determine the required temperature stability of the wavelength monitor. For BK7 glass and fused silica, the resulting etalon temperature sensitivity is about 1 GHz/K, so a 1 MHz wavelength precision requires about 1 mK temperature stability, assuming the etalon temperature sensitivity is the dominant source of temperature sensitivity in the wavelength monitor.

The signals provided by the wavelength monitor of FIG. 4 can be employed to provide wavelength monitoring as described above. In a preferred implementation of the preceding methods in connection with cavity ring-down spectroscopy, the following steps are performed. For simplicity, the following description will describe the steps for a single-source system. For the multiple-source system of FIG. 4, these steps can be carried out for each source.

First, the source is calibrated by measuring the laser output wavelength (e.g., with an external wavemeter) as a function of laser operating temperature for a fixed laser current. The first and second etalon signals are also measured as a function of laser operating temperature at the same laser current, including corrections for dark current and amplifier offsets. A low order polynomial fit is derived relating the laser wavelength to the laser temperature (a fifth order fit has been found to be sufficiently accurate). The source wavelength-temperature relation is employed to derive the relation between the etalon signals and the wavelength. In practice, the measured etalon signals are only approximately sinusoidal with respect to wavelength, and it is important to account for the deviation from sinusoidal behavior. A least squares cubic spline fit is a convenient way to describe the dependence of the etalon signals on the wavelength, because analytic inversion is possible. More specifically, this calibration provides cubic spline functions $e_1(\lambda)$ and $e_2(\lambda)$ describing the dependence of first and second etalon responses $e_1$ and $e_2$ respectively on wavelength ($\lambda$).

Since this calibration provides a relation between operating laser temperature and wavelength (for a fixed current), nominal knowledge of the temperature (e.g., the set point of a temperature control system) and current provides nominal knowledge of the wavelength. Such nominal knowledge of the wavelength is typically sufficiently accurate to resolve the above-described FSR ambiguity, and this is a preferred approach for resolving this ambiguity, since no separate coarse wavelength measurement is required.

The wavelength can be determined given a measured value $e_1$ (or $e_2$) by inverse cubic interpolation from the relevant calibration spline, once the FSR ambiguity is removed. However, as described above, a wavelength determination based on a measured value for $e_1$ will tend to be inaccurate near the dead spots of the first etalon response, and a wavelength determination based on a measure value for $e_2$ will tend to be inaccurate near the dead spots of the second etalon response.

One approach that has been considered for dealing with this issue is to determine, for each wavelength, which of $e_1$ and $e_2$ is more sensitive at that wavelength. This is a one-time calculation. To determine a wavelength from measured values of $e_1$ and $e_2$, wavelength estimates $\lambda_1$ and $\lambda_2$ are obtained from the $e_1$ and $e_2$ values by inverse interpolation. Typically the estimates $\lambda_1$ and $\lambda_2$ will not differ by very much, and it will be clear which of the two channels ($e_1$ or $e_2$) is more sensitive at wavelengths near $\lambda_1$ and $\lambda_2$. The final wavelength result is the wavelength estimate based on only the more sensitive channel. This approach has disadvantages in practice, since small drifts in the etalon responses can lead to gaps appearing in the reported wavelengths even in cases where the laser source is smoothly tuned.

Accordingly, the following alternative approach is preferred, which is an embodiment of the method described above in connection with FIGS. 1-3. When the etalon responses are in the first zone, only the second response is employed for determining wavelength, by inverse cubic interpolation of $e_2(\lambda)$. When the etalon responses are in the second zone, only the first response is employed for determining wavelength, by inverse cubic interpolation of $e_1(\lambda)$. When the etalon responses are not in the first or second zones, estimates $\lambda_1$ and $\lambda_2$ are computed by inverse cubic interpolation of $e_1(\lambda)$ and $e_2(\lambda)$ respectively. The final wavelength estimate $\lambda^*$ is a weighted linear combination of $\lambda_1$ and $\lambda_2$, having weights $w_1$ and $w_2$ which vary continuously as a function of $\theta$. All three cases can be described by the following formula: $\lambda^* = w_1(\theta)\lambda_1 + w_2(\theta)\lambda_2$, where $w_1(\theta)=0$ and $w_2(\theta)=1$ in the first zone, $w_1(\theta)=1$ and $w_2(\theta)=0$ in the second zone, and $w_1(\theta)$ and $w_2(\theta)$ are continuous functions of $\theta$, if $\theta$ is in neither the first nor the second zone. For all values of $\theta$, the weights satisfy the relation $w_1(\theta)+w_2(\theta)=1$. A piecewise linear dependence of the weights on angle in each zone, which satisfies the above conditions, is preferred for simplicity and speed of execution.

This approach avoids the problem of gaps in reported wavelengths as described above, and can also provide good results even in cases where the phase difference between the two channels is not exactly 90°.

As indicated above, the temperature sensitivity of the etalon (e.g., etalon 430 on FIG. 4) is a highly significant factor in system and instrument design, since temperature control and stability on the order of 1 mK is required for this component. The wavelength monitor is preferably fabricated as an enclosed module to facilitate temperature control by decoupling the etalon from environmental perturbations. The temperature of the wavelength monitor module is preferably under closed loop control with a set point well above room temperature (or the temperature of the environment surrounding the wavelength monitor). Operation at elevated temperatures facilitates temperature control by allowing the heat exchanger to operate primarily as a heater, avoiding non-linearities in the controller current drive circuitry near zero current flow. It is preferred for the optical components of the wavelength monitor (i.e., the etalon and associated optical components) to be assembled at an assembly temperature that is substantially the same as the elevated operating temperature of the wavelength monitor, thereby minimizing the effects of thermal expansion on wavelength monitor operation.

The preceding description of the invention is by way of example, not limitation, so the invention can also be practiced by making various modifications of the described examples. In accordance with common usage, wavelength, frequency and wavenumber have been used interchangeably, since conversions between these quantities are well known in the art. It is also noted that "substantially periodic" is intended to include etalon responses which deviate from perfect wavelength periodicity as a result of material dispersion in the etalon, and/or as a result of the inverse relation between frequency and wavelength, since such deviations from perfect periodicity are typically negligible in practice.

The invention claimed is:

1. A method for measuring a wavelength of optical radiation, the method comprising:
   a) providing a first signal having a substantially periodic dependence on the wavelength;
   b) providing a second signal having a substantially periodic dependence on the wavelength, wherein the first and second signals have substantially the same period, and wherein the first and second signals have a phase difference substantially equal to an odd multiple of 90 degrees;
   c) providing first and second measured values of the first and second signals, respectively;
   d) determining whether or not the measured values are within a predetermined first zone, wherein sensitivity of the first signal to wavelength change is minimal in the first zone;
   e) determining whether or not the measured values are within a predetermined second zone, wherein sensitivity of the second signal to wavelength change is minimal in the second zone;
   f) if the measured values are within the first zone, determining a wavelength in part from the second measured value without making use of the first measured value;
   g) if the measured values are within the second zone, determining a wavelength in part from the first measured value without making use of the second measured value;
   h) if the measured values are not within the first zone and not within the second zone, determining a wavelength in part from both the first and second measured values.

2. The method of claim 1, wherein said determining a wavelength in part from the second measured value without making use of the first measured value comprises inverse cubic interpolation of said second measured value.

3. The method of claim 1, wherein said determining a wavelength in part from the first measured value without making use of the second measured value comprises inverse cubic interpolation of said first measured value.

4. The method of claim 1, wherein said first signal is provided by a method comprising:
   illuminating an etalon with said radiation;
   receiving a reflected signal from the etalon;
   receiving a transmitted signal from the etalon;
   providing a ratio of the reflected signal to the transmitted signal as said first signal.

5. The method of claim 1, wherein said second signal is provided by a method comprising:
   illuminating an etalon with said radiation;
   receiving a reflected signal from the etalon;
   receiving a transmitted signal from the etalon;
   providing a ratio of the reflected signal to the transmitted signal as said second signal.

6. The method of claim 1, further comprising providing a coarse wavelength measurement, whereby wavelength ambiguity due to said periodicity of said first and second signals can be removed.

7. The method of claim 6, wherein said coarse wavelength measurement is determined from temperature and current of a semiconductor laser providing said optical radiation.

8. The method of claim 1, wherein an angular coordinate $\theta$ is defined based on the first and second measured values such that said first zone includes angles at or near $\theta=0°$ and angles at or near $\theta=180°$, and such that said second zone includes angles at or near $\theta=90°$ and angles at or near $\theta=270°$.

9. The method of claim 8, wherein said determining a wavelength in part from both the first and second measured values comprises:
   computing a first intermediate value by inverse cubic interpolation of said first measured value;
   computing a second intermediate value by inverse cubic interpolation of said second measured value;
   combining the first and second intermediate values in a weighted linear combination, wherein weights of the linear combination vary continuously as a function of said angular coordinate $\theta$.

10. The method of claim 1, wherein said first and second signals are obtained by passing first and second beams of said optical radiation through an etalon at different angles of incidence.

11. The method of claim 10, wherein said angles of incidence are selected to provide said phase difference.

12. The method of claim 10, further comprising providing temperature control of said etalon.

13. The method of claim 12, wherein said etalon is maintained at an etalon operating temperature substantially above room temperature.

14. The method of claim 13, wherein said operating temperature is substantially the same as an assembly temperature of said etalon and associated optical elements.

15. A cavity ring-down spectroscopy instrument including a wavelength monitor operating according to the method of claim 1, and further comprising one or more optical sources, each optical source having its wavelength monitored by said wavelength monitor, whereby multi-species detection capability can be provided.

* * * * *